United States Patent [19]
Connery

[11] 3,849,614
[45] Nov. 19, 1974

[54] TAMPER SWITCH DEVICE FOR DETECTION OF RELATIVE MOTION

[75] Inventor: Colin A. Connery, New York, N.Y.

[73] Assignee: Calc Securities Systems, Inc., New York, N.Y.

[22] Filed: May 14, 1973

[21] Appl. No.: 359,863

[52] U.S. Cl.......... 200/61.41, 200/61.43, 200/61.93
[51] Int. Cl. ............................................. H01h 3/16
[58] Field of Search....... 200/DIG. 34, 61.41–61.53, 200/159 R, 166 BA, 61.04, 61.07, 61.1, 61.13, 61.2, 61.21, 61.24, 61.76, 61.78, 67 D, 67 DA, 67 DB, 61.58 R, 61.59, 61.93

[56] References Cited
UNITED STATES PATENTS

| | | | |
|---|---|---|---|
| 2,432,444 | 12/1947 | Roberts...................... | 200/DIG. 34 |
| 2,522,478 | 12/1950 | Clayton........................... | 200/61.41 |
| 3,017,618 | 1/1962 | Cross........................... | 200/61.41 X |
| 3,097,272 | 7/1963 | Hautly.............................. | 200/61.49 |
| 3,444,465 | 5/1969 | Teixeira....................... | 200/61.41 X |
| 3,488,461 | 1/1970 | Webb........................... | 200/61.44 X |
| 3,699,296 | 10/1972 | Harris....................... | 200/166 BA X |

OTHER PUBLICATIONS

Standard Handbook for Electrical Engineers, Chap. 4, Sec. 395-Rubber, pp. 4–192 to 4–196 and sec 429, Epoxy Resins, pp. 4–211 to 4–213, Fink and Carroll, McGraw-Hill, Tenth Edition.

*Primary Examiner*—James R. Scott
*Attorney, Agent, or Firm*—Pennie & Edmonds

[57] ABSTRACT

Tamper switch devices are described for detecting motion relative to a point on a surface where they are placed. These devices comprise a hollow shell open at one end that is adapted to be placed on a surface to form an enclosure, an element within the enclosure that may be secured at least temporarily to the surface, and transducer means for detecting any movement between the shell and the element after the element is secured to the surface.

22 Claims, 7 Drawing Figures

PATENTED NOV 19 1974 3,849,614

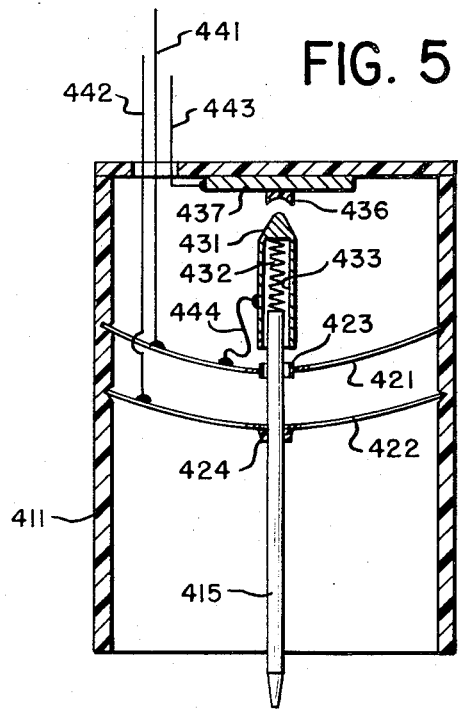
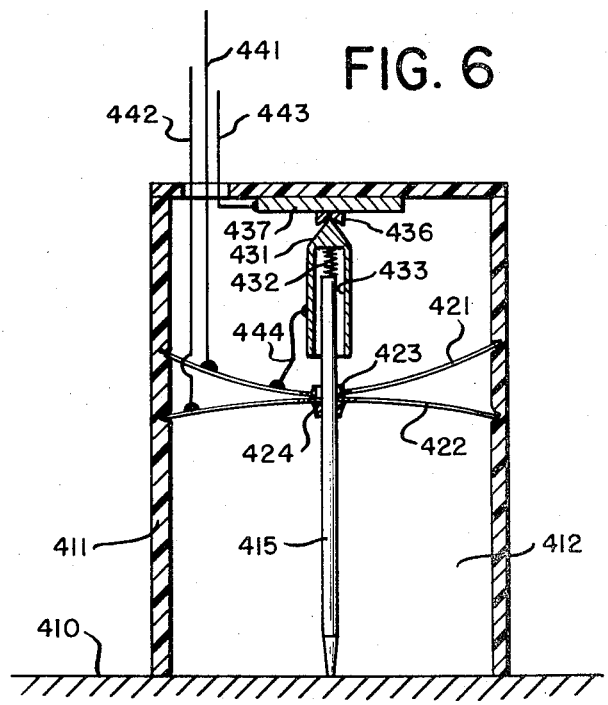
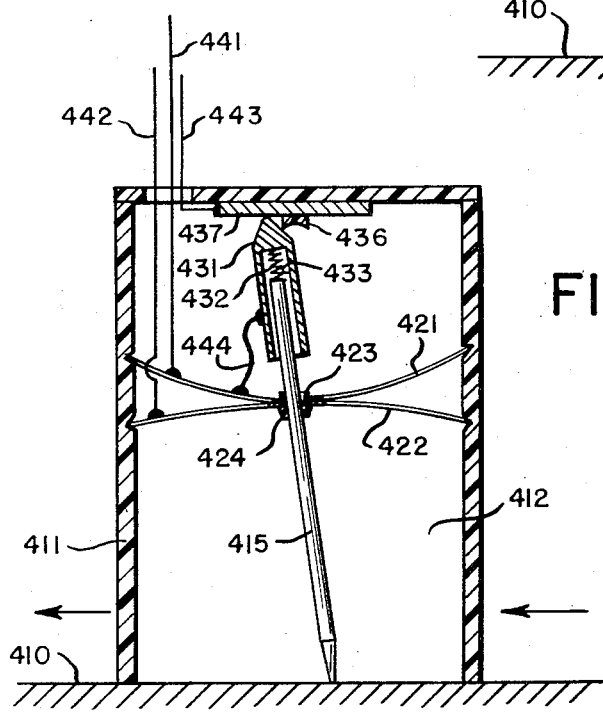

3,849,614

TAMPER SWITCH DEVICE FOR DETECTION OF RELATIVE MOTION

BACKGROUND OF THE INVENTION

This invention concerns the detection of motion relative to a surface and, more particularly, devices such as tamper switches that detect such motion relative to themselves.

One of the most important uses of a relative motion detector is the detection of unauthorized movement of an object to which the relative motion detector is attached. Thus, when connected to suitable electrical circuitry, power supply, and alarm, the relative motion switch may be used to prevent theft of the object to which it is attached.

Conventional tamper switches, however, are sensitive only to motion along one axis. In common usage, the tamper switch is placed against a surface such as a wall or lid and is oriented so that the axis of sensitivity is perpendicular to the surface on which it is placed. Thus, the tamper switch detects its removal from the surface on which it is located.

Typically, a tamper switch comprises an enclosure in which there is a spring-biased plunger. When the tamper switch is set on a surface, the plunger is forced into the enclosure. When the switch is removed from the surface on which it is placed, the spring forces the plunger out of the enclosure, thereby producing a change that can be detected and used to activate an alarm. A conventional tamper switch can be defeated by holding the plunger, or other motion sensitive mechanism, stationary while the switch is lifted from the surface. This may be done by sliding the switch across the surface to an edge or other point where the plunger becomes exposed and can be held stationary. Alternatively, a thin stiff piece of material such as celluloid may be slid underneath the switch so as to hold the plunger stationary as the switch is lifted from the surface.

To prevent such defeat of the tamper switch, the switch is often made more sensitive to minute changes in the position of its motion sensor. This, however, increases the difficulty of initial placement and adjustment of the switch and it also increases the sensitivity of the device to vibration, shock, and normal dimensional changes caused by factors such as humidity and temperature. The device is also more difficult and more expensive to make because dimensional tolerances are more demanding. As a result, the limitations of conventional tamper switches have forced serious compromises in the utility, reliability, ease of adjustment, size and cost of these devices.

One potential use for the tamper switch that has been severely restricted because of its vulnerability to defeat is its use in attaching a security loop to a surface. In using such a loop to protect an object from theft, three factors should be considered in determining the security afforded to the object: the nature of the loop, the point of attachment to a surface of the object, and the means of attachment. These three factors are normally treated as links in a chain wherein the weakest factor determines the degree of overall security.

Those skilled in the art know many techniques for improving the tamper-resistant qualities of the security loop. The second factor, the point of attachment to the object, is largely fixed by the nature of the object and its intended use. The third factor, the fastening mechanism, is often the weakest link. For example, aesthetic, structural, or practical considerations may preclude the uses of screws, nails, rivets, or other mechanisms that might damage the surface of the object. If it is necessary to remove the security loop after it has been attached to the surface, the fastening mechanism is often designed to be weaker than the surface to which it adheres. For many objects, such as art works, that would lose their value if injured, it is reasonable to expect that a thief would attack the fastening mechanism rather than make a self-defeating attack on the object.

Because of the weakness of the fastening mechanism, frequent attempts have been made to user tamper switches for the connection of a security loop to the surface of an object. These attempts, however, have met with only limited success. When the surface is flat, a conventional tamper switch is readily subject to defeat by the techniques described above. To prevent such defeat, a barrier must be created around the base of the switch so that it cannot be slid across the surface of probed from the side. Such a barrier is only as secure as the mechanism that fastens the barrier to the surface. Thus, one is again confronted with the problem that he seeks to eliminate: the role of the fastening mechanism.

A tamper switch may also be used to anchor a security loop to a sturdy unmovable surface such as a floor or a wall. This is done to prevent the undetected theft of the security loop and its parts as a whole. The major difficulty in anchoring a security loop to such a surface is that the cost and difficulty of anchoring the loop increases with the strength of the surface. An important instance of this problem concerns the use of radio transmitters as a means of linking several remote security loops to a radio receiver and an alarm in a security system. Radio transmitters can be housed in tamper proof enclosures designed to withstand the most determined assault long enough for the transmitter to get off a signal. The problem with the use of transmitters is that the transmitter can first be wrapped in metal foil and thereby shielded from the receiver. This will prevent any signal from being received and any alarm given off while the transmitter is being disabled. To prevent this, the transmitter may be mounted on a sturdy unmovable non-metallic surface so that it is not possible to shield the transmitter on that side before an attempt is made to disable it. Unfortunately the trouble and expense of such a mounting typically offsets the convenience and savings gained by the use of radio transmitters.

To avoid the cost of mounting the transmitter on a non-metallic surface, one might fasten a tamper switch to the bottom of the transmitter housing so that lifting the transmitter from the surface causes a signal to be sent. The time it would take for even the most agile thief to shield the bottom of the transmitter would be more than enough time for a signal to be transmitted and detected at a receiver. This approach, however, can still be thwarted simply by using a sheet of stiff material to prevent the motion sensor of the tamper switch from moving at the time the transmitter is lifted.

Accordingly, an improved tamper switch is desired that is able to detect all motion, both vertical and lateral, with respect to a surface while also being well protected from jamming with a sheet of stiff material.

SUMMARY OF THE INVENTION

In general terms, the relative motion detector, or tamper switch, of my invention comprises a hollow shell open at one end that is adapted to be placed on a surface to form an enclosure, an element within the enclosure that may be secured at least temporarily to the surface, and means for detecting any movement between the enclosure and the element after the element is secured to the surface. Because of the nature of the alarm mechanism, the open end of the enclosure may be fastened to the surface by any convenient means without compromising the tamper proof qualities of the detector. These means may simply be the weight of the enclosure itself or an appropriate amount of glue. At the same time, the construction of the tamper switch provides an extremely reliable and stable device that does not have critical manufacturing tolerances or mounting procedures and can readily be miniaturized.

By attaching the detector to the surface of an object, the object can be incorporated into a security loop without significantly altering the object's utility or appearance either at the time the object is in the loop or afterwards. There is no need for the detector to penetrate or deface the surface of the object. Many known alarm devices may be connected to the security loop to produce an alarm whenever there is relative motion between the enclosure and the element within the enclosure or whenever anyone attempts to tamper with the detector.

An illustrative embodiment of the relative motion detector, or tamper switch, of the invention comprises a hollow cylindrical electrode and a resilient, electrically conducting feeler wire axially mounted in the cylindrical electrode. The cylindrical electrode is open at one end and the wire protrudes therethrough, its length being such that when the cylindrical electrode is placed on a surface with the open end adjacent the surface, the opposition of the surface causes the feeler wire to buckle and contact the cylindrical electrode, thereby closing an electrical circuit formed between the feeler wire and the hollow electrode. This closing of the electrical circuit is used to arm an alarm device.

Lifting the cylindrical electrode from the surface breaks the electric circuit, as the resilient feeler wire returns to its axial position in the cylindrical electrode. Breaking of this circuit is caused to activate an alarm device.

The detection of lateral relative motion between the cylindrical electrode and the surface on which it is placed is accomplished by separating the feeler wire and the cylindrical electrode. Friction between the end of the wire and the surface causes the end of the feeler wire in contact with the surface to remain stationary with respect to the surface. Accordingly, if one of the surface and the cylindrical electrode is moved laterally with respect to the other, the distance between the end of the feeler wire and the cylindrical electrode changes and may be detected as follows. If the direction of relative motion is such that the end of the feeler wire moves away from the side of the electrode in contact with the feeler wire, the feeler wire moves away from the electrode and electrical connection is broken. Moreover, if the direction of relative motion is such that the end of the feeler wire moves toward the side where it contacts the electrode, the feeler wire buckles and springs away from the electrode, thereby terminating the electrical connection.

Another embodiment of my invention provides separate electrodes for the detection of lateral and vertical movement. This embodiment is similar in structure to the foregoing embodiment but uses two hollow open-ended cylindrical electrodes that are mounted about the same axis and insulated from one another. When this device is placed on a surface, the opposition of the surface causes the feeler wire to buckle and contact the electrode that is more remote from the surface. Again, this closes an electrical circuit thereby arming an alarm device. Relative vertical motion from the surface is detected when the device is lifted because the feeler wire returns to its position along the axis of the cylinder, thereby breaking the electrical circuit. At the same time, friction causes the end of the feeler wire in contact with the surface to remain stationary with respect to that surface. Consequently, relative lateral motion between the surface and the device causes the feeler wire and the electrode adjacent the surface to come into contact, thereby closing another electrical circuit that indicates such movement of the feeler wire. Of course, this circuit may be connected to the same alarm device as the first circuit.

In still another embodiment of the invention, a probe is mounted inside a shell having an open end and relative motion is sensed by a transducer that detects changes in the position of the probe relative to the shell. Again, the probe protrudes through the open end of the shell and is designed to be pushed back into the shell when the shell is placed on a surface to form an enclosure. As long as the shell remains in contact with the surface, the probe remains stationary and no alarm sounds. If, however, the shell is removed from the surface, the position of the probe changes and an alarm is caused to ring. At the same time, if one of the shell or the surface is moved relative to the other, friction between the end of the probe and the surface causes the end of the probe to remain stationary on the surface while the relative positions of the shell and surface change. This also produces a change that is sensed by the transducer to form an alarm signal. As will be detailed below, numerous types of transducers may be used in this embodiment of the invention.

Finally, a snap-action switch is described incorporating the principles of my invention.

In addition to detecting both vertical and lateral motion from a surface, all of the foregoing devices of my invention also prevent jamming. Specifically, if someone were to insert a stiff piece of material into the enclosure between the shell and the surface on which it rests in order to disarm the feeler wire or probe within the enclosure, the edge of the material would push against the end of the wire or probe. This would dislodge the end of the wire or probe from its stationary position on the surface, thereby producing a detectable change in the device that would be sufficient to trip an alarm.

BRIEF DESCRIPTION OF THE DRAWING

These and other objects, features, and elements of my invention will be more readily apparent from the following detailed description of the drawing in which:

FIGS. 5, 6, and 7 are schematic representations of a fourth illustrative embodiment of my invention.

DETAILED DESCRIPTION OF THE INVENTION

Figure 1:
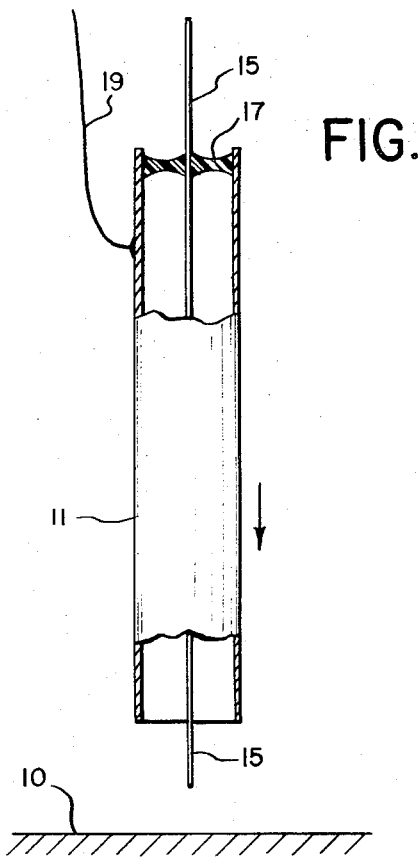
FIGS. 1 and 2 are schematic representations of a first illustrative embodiment of my invention.
Figure 2:
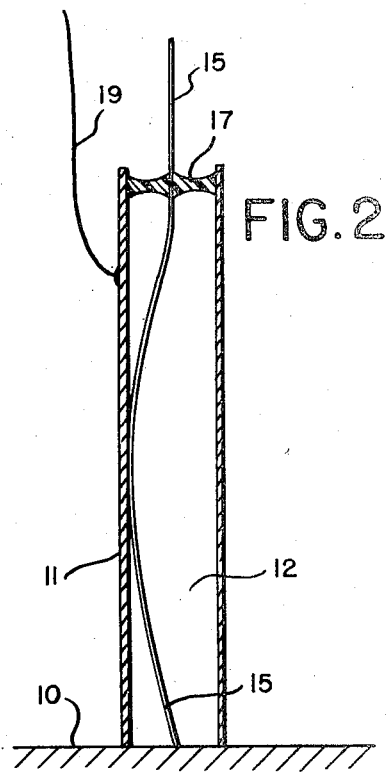

A first illustrative embodiment of my invention is shown in FIGS. 1 and 2. This apparatus comprises a hollow cylindrical electrode 11 and a resilient, electrically conducting feeler wire 15 mounted on the axis of the cylindrical electrode. Preferably, feeler wire 15 is mounted at one end of cylindrical electrode 11 by an electrically insulating material 17, such as an epoxy resin. The other end of electrode 11 is open; and feeler wire 15 extends through this opening.

Electrode 11 and feeler wire 15 comprise a switch in an electrical circuit. One lead to this circuit may be feeler wire 15. Electrode 11 is connected to this circuit through lead 19.

To close the switch, electrode 11 is placed on a surface 10, as shown in FIG. 2, thereby forming an enclosure 12. Because feeler wire 15 ordinarily extends beyond the open end of electrode 11, surface 10 pushes the feeler wire back against the electrically insulating material 17 in which it is mounted. Because this material is relatively rigid, feeler wire 15 buckles and comes into contact with the inside of cylindrical electrode 11, thereby completing the circuit. This closing of the electrical circuit may be used for any purpose such as arming an alarm device. At the same time, friction between the end of feeler wire 15 and surface 10 causes the end of feeler wire 15 to be secured to one point on surface 10 within enclosure 12.

The electric circuit may be broken simply by lifting the cylindrical electrode from the surface. Because the feeler wire is resilient, it will return to its initial axial position within the cylindrical electrode, thereby opening the electrical circuit and activating the alarm device. Lateral motion of the feeler wire or the cylindrical electrode may also be detected because the end of the feeler wire in contact with surface 10 remains stationary on the surface. Accordingly, if one of surface 10 and electrode 11 is moved laterally with respect to the other, the distance between the end of the feeler wire and the cylindrical electrode also changes. If the direction of relative motion is such that the end of the feeler wire moves away from the side of the electrode in contact with the feeler wire, the feeler wire moves away from the electrode and electrical connection is broken. Moreover, if the direction of relative motion is such that the end of the feeler wire moves toward the side where it contacts the electrode, the feeler wire buckles and springs away from the electrode, thereby terminating the electrical connection.

Figure 3:
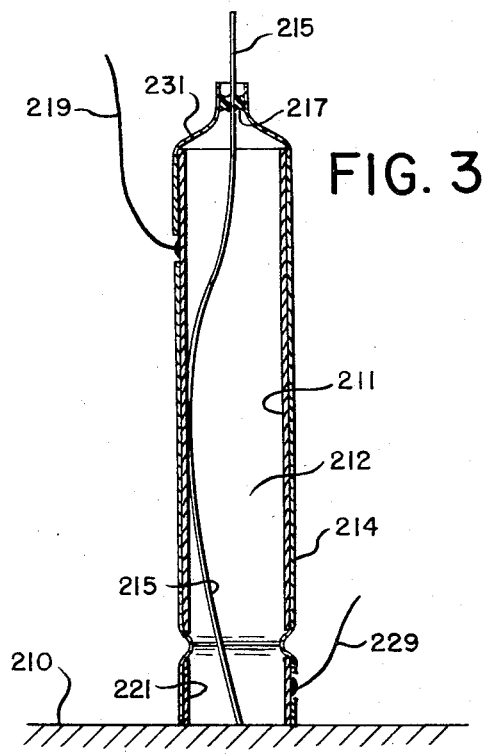
FIG. 3 is a schematic representation of a second illustrative embodiment of my invention.

Another embodiment of the invention which provides more reliable means for detecting lateral motion of the feeler wire or cylindrical electrode is illustrated in FIG. 3. In this embodiment first and second hollow, open-ended cylindrical electrodes 211 and 221 are axially mounted and are insulated from one another. A typical mounting means 231 is a piece of heat shrink tubing that surrounds the two electrodes and also provides physical separation between the two. A resilient, electrically conducting feeler wire 215 is axially mounted within the two cylindrical electrodes and is insulated from both of them. Preferably, feeler wire 215 is mounted at one end of the axis defined by the cylindrical electrodes, and typical mounting means are provided by a necked-down portion of the heat shrink tubing and a small amount of epoxy resin that secures the feeler wire to the tubing. At the other end of the axis of the two electrodes there is an opening through which feeler wire 215 extends.

Electrode 211 and feeler wire 215 comprise one switch in a first electrical circuit, and electrode 221 and feeler wire 215 comprise a second switch in a second electrical circuit. Illustratively, feeler wire 215 is the ground lead for both circuits. Electrode 211 is connected to the first electrical circuit through lead 219, and electrode 221 is connected to the second electrical circuit through lead 229.

To operate this embodiment of my invention, it is placed on a surface 210 with its open end adjacent the surface, thereby forming an enclosure 212. Because feeler wire 215 ordinarily extends beyond this open end, surface 210 pushes the feeler wire back against the electrically insulating material 217 in which it is mounted. Because this material is relatively rigid, feeler wire 215 buckles and comes into contact with the inside of cylindrical electrode 211, thereby completing the first electrical circuit. This closing of the first electrical circuit may be used for any purpose such as arming an alarm device. At the same time, friction between the end of wire 215 and surface 210 causes the end of feeler wire 215 to be secured to one point on surface 210 within enclosure 212.

The first electrical circuit may be broken simply by lifting the device from surface 210. Because the feeler wire is resilient, it will return to its initial axial position within the cylindrical electrodes, thereby opening the first electrical circuit and activating the alarm device. In addition, because the end of feeler wire 215 in contact with surface 210 remains stationary with respect to that surface, relative lateral motion between surface 210 and lower cylindrical electrode 221 brings feeler wire 215 into contact with electrode 221, thereby closing the second electrical circuit. By suitable means, this closing of the second electrical circuit may be used to activate the alarm device.

Figure 4:
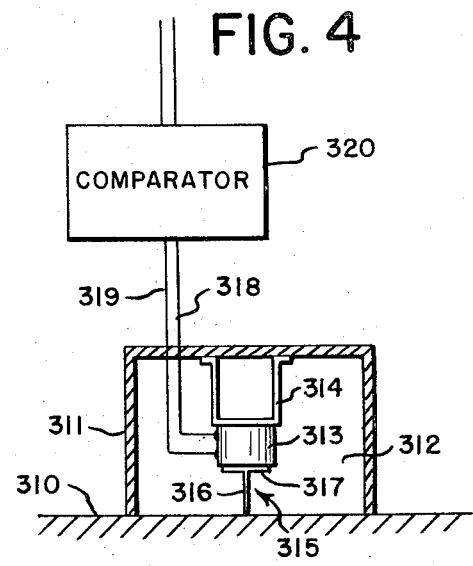
FIG. 4 is a schematic representation of a third illustrative embodiment of my invention.

A third embodiment of the invention is illustrated in FIG. 4. In this embodiment, a transducer 313 is mounted on a support 314 in a hollow, open-ended shell 311. A probe 315 is secured at its base 317 to a surface of the transducer so that its stem 316 extends slightly beyond the open end of shell 311 when the open end is not placed on a surface. Transducer 313 may be a conventional microphone element that senses minute changes in its compression caused by forces exerted on the probe. For example, transducer 313 may be a variable resistance carbon element, a variable capacitor, or a piezoelectric transducer whose electrical characteristics vary with changes in pressure. Transducer 313 is connected through leads 318, 319 to electrical apparatus 320, such as a bridge circuit, that detects changes in the output of the transducer.

To operate this embodiment of my invention, shell 311 is placed on a surface 310 with its open end adjacent the surface, thereby forming an enclosure 312. Because the stem of probe 315 ordinarily extends slightly beyond this open end, surface 310 pushes it back against shell 311, thereby compressing transducer 313. This compression is sensed by transducer 313 to establish a reference in the electrical apparatus 320. At the same time, friction between the end of stem 316 and surface 310 causes probe 315 to remain stationary on surface 310 within enclosure 312.

If shell 311 is later lifted from surface 310, probe 315 returns to its original position, thereby changing the compression on transducer 313. This change is sensed by the transducer and the resulting change in the signal applied to electrical apparatus 320 may be used to activate an alarm device. In addition, because the end of stem 316 that is in contact with surface 310 remains stationary with respect to that surface, relative lateral motion between surface 310 and shell 311 causes the probe to rotate about its point of contact on surface 310, thereby changing the pressure exerted by base 317 on different portions of the surface of transducer 313. This in turn changes the signal applied to electrical apparatus 319 and this change may be used to activate an alarm.

Numerous other motion-sensing transducers may be used as the transducer in this embodiment of my invention. For example, the probe may be magnetic or may be attached to a magnet and the motion-sensing element may be a coil of electrically conducting wire. In this case, any movement between the magnet and the coil causes the magnetic flux density at the coil to change, thereby inducing a voltage in the coil that may be detected to activate an alarm. Alternatively, a conventional phonograph cartridge may be used in a structure similar to that of FIG. 4 by mounting the cartridge so that the needle extends slightly beyond the open end of the shell when the shell is not in contact with the surface. Again, placing the shell on the surface causes the needle to be pushed back into the shell and to become affixed to a particular portion of the surface, thereby establishing a reference position. Subsequent lifting of the shell or relative motion between the shell and the surface is detected in the phonograph cartridge and may be used to trigger an alarm. It is also possible to detect the tension or compression in a spring or feeler wire that extends beyond the open end of the shell and is compressed or buckled when the open end is placed on the surface of an object. This device may have a structure similar to that shown in FIG. 1 but with a tension- or compression-sensing transducer secured to the feeler wire. Numerous other transducers will be evident to those skilled in the art.

As is known in the art, many alarm devices may be jammed simply by inserting a stiff piece of material such as a plastic card into their mechanism. The structure of the foregoing embodiments of my invention, however, is designed to thwart such attempts. Specifically, if someone were to insert a plastic card into the enclosure between the shell and the surface on which it rests in an attempt to disarm the feeler wire or probe within the enclosure, the edge of the plastic card would push against the end of the wire or probe. In the case of the feeler wire, this would dislodge the end of the wire from its stationary position on the surface and cause the feeler wire to separate from the electrode in the embodiment shown in FIGS. 1 and 2 or contact the lower electrode in the embodiment shown in FIG. 3. Either event would trip an alarm. In the case of the probe and the transducer, the edge of the card would cause the probe to rotate about a point on the surface of the transducer, thereby altering the pressure exerted by base 317 on transducer 313. This would be sensed by the transducer and an alarm signal would be produced.

If desired, my invention may also be implemented in a snap-action switch as shown in FIGS. 5, 6, and 7. This apparatus comprises a hollow shell 411, a stiff nonconducting probe 415, means for mounting the probe within the shell, and means for making electrical connections within the shell. Shell 411 is open at one end and probe 415 protrudes therethrough. The mounting means comprises two flexible bands 421, 422 of a spring metal, such as phosphor-bronze. Probe 415 passes through an aperture 423 in the upper band 421 of spring metal and is secured by epoxy cement 424 to the lower band 422. An electrically conducting sleeve 431 surrounds one end of probe 415 and is supported on the probe by a spring 432 in an aperture 433 within the sleeve. When the switch is closed, sleeve 431 is designed to contact an insulating seat 436 mounted on an electrode 437. A common lead 441 is connected to band 421 of spring metal; a second lead 442 is connected to the other band 422 of spring metal; a third lead 443 is connected to electrode 437; and a fourth lead 444 connects band 421 to sleeve 431.

Bands 421, 422 of spring metal constitute a snap-action switch. To close this switch shell 411 is placed on a surface 410, as shown in FIG. 6, thereby forming an enclosure 412. Because probe 415 ordinarily extends beyond the open end of shell 411, surface 410 pushes the probe back into the shell. This causes band 422 to snap from a convex position to a concave position and thereby come in contact with band 421. This closes an electrical circuit through leads 441 and 442 and bands 421 and 422 that may be used to arm an alarm device. In addition, probe 415 also pushes conducting sleeve 431 into insulating seat 436 and compresses spring 432.

The force exerted by compressed spring 432 is just enough to cause band 422 to spring apart from band 421 whenever shell 411 is lifted from surface 410. This breaks the circuit between leads 441 and 442 and thereby triggers an alarm.

In addition, as shown in FIG. 7, because the end of probe 415 in contact with surface 410 remains stationary on the surface, any lateral motion of shell 411 or surface 410 causes probe 415 to pivot about the point where it is attached to band 422. This causes conducting sleeve 431 to slide off insulating seat 436 and come into contact with electrode 437. This closes a circuit through leads 443, 444, and 441; and this can be used to trigger an alarm indicating lateral motion. Furthermore, if an attempt is made to jam the device by sliding a stiff piece of material between surface 410 and the edge of shell 411, the material will push probe 415 to one side. This also causes the probe to pivot about its point of attachment to band 422 and causes conducting sleeve 431 to come into contact with electrode 437, thereby triggering the alarm.

As will be evident to those skilled in the art, numerous other devices can be made utilizing the same basic structure of the foregoing embodiments: namely, a hollow shell open at one end that is held against a surface to form an enclosure, an element within the enclosure that is secured at least temporarily to the surface, and means for detecting any movement between the enclosure and the element after the element is secured to the surface. It will be understood that the term "hollow shell" refers to a shell having a cavity inside and that any fluid, such as air, may be present in this cavity provided it does not prevent operation of the tamper switch. It will also be recognized that the element that is secured to the surface may be part of the means for detecting movement just as the tip of the feeler wire is part of the feeler wire that closes and opens the alarm circuit. Similarly, it will be recognized that the enclosure may also be part of the means for detecting movement just as the enclosure in the embodiment of FIGS. 1 and 2 is the electrode that is part of the alarm circuit.

Of the embodiments described, I prefer that shown in FIGS. 1 and 2 because of its simplicity, ease of construction and low cost. In various applications, however, tradeoffs may exist that would make the use of one of the other embodiments more advantageous.

The applications of the above-described relative motion detectors are numerous. They may simply be placed on any object whose relative motion is to be sensed with the open end in contact with the surface of the object. If necessary, to keep the detector from falling off the object, the open end of the detector may be secured to the object by any appropriate means. Any adhesive tape or glue is sufficient. Despite the relative weakness of such a connection between the detector and the surface, there is no way to remove the surface from the detector without triggering an alarm signal. Moreover, as explained above, any attempt to jam the detector will likewise result in signaling an alarm.

If desired, the relative motion detector may also be attached to the object whose motion is to be detected in such a way that the open end of the detector bears against a surface on which the object rests. Such an arrangement, however, is less desirable because an alarm would not necessarily be produced if the detector and the object to which it was attached were separated.

Appropriate circuitry for operating the alarm device under the conditions set forth above will be apparent to those skilled in the art. It should be emphasized that the circuitry should be designed so that an alarm rings if the wires from the detector to the alarm are cut. In addition, it should be noted that the apparatus may readily be employed with a carrier current alarm system such as that presently being sold by Heathkit.

As will be apparent to those skilled in the art, numerous other modifications may be made to the preferred embodiments described and illustrated herein without departing from the scope of the invention as defined in the claims.

What is claimed is:

1. A device for detecting relative motion between itself and a surface upon which it may be placed comprising:
    a hollow shell that is open at one end and is adapted to be placed on the surface to form an enclosure;
    an element that may be secured at least temporarily to said surface within the enclosure; and
    means for detecting any movement between said enclosure and said element after the element is secured to the surface,
    said detecting means comprising:
        a probe mounted in said shell and extending beyond the open end of said shell enough that when said open end is placed on said surface the surface pushes the probe back into the shell, and
        an electro-mechanical transducer means for detecting changes in the position of said probe, and said element that may be secured to said surface comprising an end of said probe that extends beyond the open end of said shell when the open end is not placed on a surface.

2. The device of claim 1 further comprising apparatus for detecting changes in an output signal from the transducer means.

3. A switch for detecting relative motion between itself and a surface upon which it may be placed comprising:
    a hollow axially extending shell that is open at one end and has at least a first inner surface that is electrically conducting; and
    a flexible, resilient, electrically conducting wire mounted in said shell, extending axially therethrough, and separated from said conducting inner surface, an end of said wire extending beyond the open end of said shell enough that when said open end of the shell is placed on said surface the end of the wire is pushed back into the shell and the wire buckles and makes electrical contact with the electrically conducting first inner surface.

4. The switch of claim 3 wherein the electrically conducting inner surface is a hollow cylindrical electrode.

5. The switch of claim 3 wherein the electrically conducting wire is mounted in an epoxy resin that is secured to the electrically conducting inner surface.

6. The switch of claim 3 further comprising a second electrically conducting surface that is inside the hollow shell adjacent its open end, is electrically insulated from the first surface, and is separated from the conducting wire.

7. The switch of claim 6 wherein the second electrically conducting surface is a hollow cylindrical electrode.

8. The switch of claim 7 wherein the first electrically conducting inner surface is a hollow cylindrical electrode that is coaxial with the second electrically conducting surface.

9. The switch of claim 8 wherein the hollow cylindrical electrodes are mounted coaxially within a heat shrink tubing.

10. A switch for detecting relative motion between itself and a surface upon which it may be placed comprising:
    a hollow shell that is open at one end;
    a probe mounted in said shell and extending beyond the open end of said shell enough that when said open end is placed on said surface the surface pushes the probe back into the shell; and
    an electro-mechanical transducer means for detecting changes in the position of said probe.

11. The switch of claim 10 further comprising apparatus for detecting changes in an output signal from the transducer means.

12. The switch of claim 10 wherein the probe and transducer means are a needle and a phonograph cartridge.

13. The switch of claim 10 wherein the probe and transducer means comprise a magnet and a coil of electrically conducting wire.

14. The switch of claim 10 wherein the transducer means is a microphone element.

15. A snap-action switch for detecting relative motion between itself and a surface upon which it may be placed comprising:
a hollow shell that is open at one end;
at least one flexible element that can be switched mechanically between first and second positions;
a probe that is secured to said flexible element and extends beyond the open end of said shell when the flexible element is in its first position enough that when said open end is placed on said surface the probe forces the flexible element to change from its first to its second position;
first sensing means for closing a first electrical circuit when the flexible element is in its second position; and
second sensing means for closing a second electrical circuit when the flexible element is in its second position and the end of the probe in contact with the surface is displaced from its normal position.

16. The switch of claim 15 wherein the second sensing means comprises:
a conducting sleeve mounted on a spring on the end of the probe within the shell;
an electrode;
an insulating seat located on the electrode so that when the flexible element is in its second position the sleeve is thrust against the insulating seat; and
electrical connections to the conducting sleeve and the electrode, whereby a circuit is closed if the position of the probe on the surface is changed enough to move the conducting sleeve off the insulating element.

17. A device for detecting relative motion between itself and a surface upon which it may be placed comprising:
a hollow shell that is open at one end and is adapted to be placed on the surface to form an enclosure;
an element that may be secured at least temporarily to said surface within the enclosure; and
means for detecting any movement between said enclosure and said element after the element is secured to the surface,
said detecting means comprising:
an electrically conducting surface that is part of the hollow shell, and
a flexible, resilient, electrically conducting wire mounted in said shell, extending axially therethrough and separated from said conducting surface, an end of said wire extending beyond the open end of said shell enough that when said open end is placed on said surface the end of the wire is pushed back into the shell and the wire buckles and makes electrical contact with the electrically conducting surface, and
said element that may be secured to the surface being the end of the wire that extends beyond the open end of the shell when the wire is not buckled.

18. A device for detecting relative motion between itself and a surface upon which it may be placed comprising:
a hollow shell that is open at one end and is adapted to be placed on the surface to form an enclosure;
an element that may be secured at least temporarily to said surface within the enclosure; and
means for detecting any movement between said enclosure and said element after the element is secured to the surface,
said detecting means comprising:
a snap action switch mounted within the hollow shell, said switch having at least one flexible element that can be switched between first and second positions,
means for sensing which position the flexible element is in, and
a probe that is secured to said flexible element and extends beyond the open end of said shell when the flexible element is in its first position enough that when said open end of the shell is placed on said surface the probe is pushed back into the shell forcing the flexible element to change from its first to its second position, and
said element that may be secured to the surface being the end of the probe that extends beyond the open end of the shell when the flexible element is in its first position.

19. The device of claim 18 further comprising:
first sensing means for closing a first electrical circuit when the flexible element is in its second position; and
second sensing means for closing a second electrical circuit when the flexible element is in its second position and the end of the probe in contact with the surface is displaced from its normal position.

20. A switch for detecting relative motion between itself and a surface upon which it may be placed comprising:
a hollow axially extending shell that is open at one end and has first and second inner surfaces that are electrically conducting, said second surface being a hollow cylindrical electrode adjacent the open end of the shell and electrically insulated from the first surface; and
a flexible, resilient, electrically conducting wire mounted in said shell, extending axially therethrough, and separated from said conducting first and second surfaces, said wire extending beyond the open end of said shell enough that when said open end is placed on said surface the wire buckles and makes electrical contact with the electrically conducting first inner surface.

21. The switch of claim 20 wherein the first electrically conducting inner surface is a hollow cylindrical electrode that is coaxial with the second electrically conducting surface.

22. The switch of claim 21 wherein the hollow cylindrical electrodes are mounted coaxially within a heat shrink tubing.

* * * * *